J. W. HUDSON.
Corn-Planter.
No. 26,770.
Patented Jan. 10, 1860.
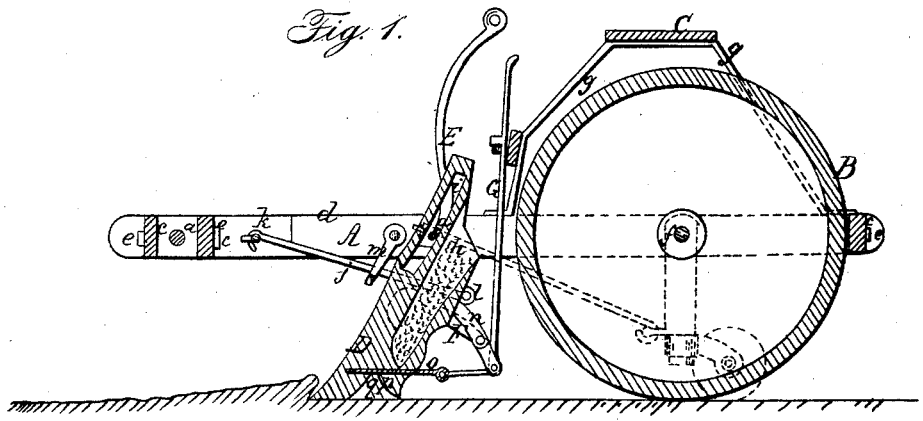
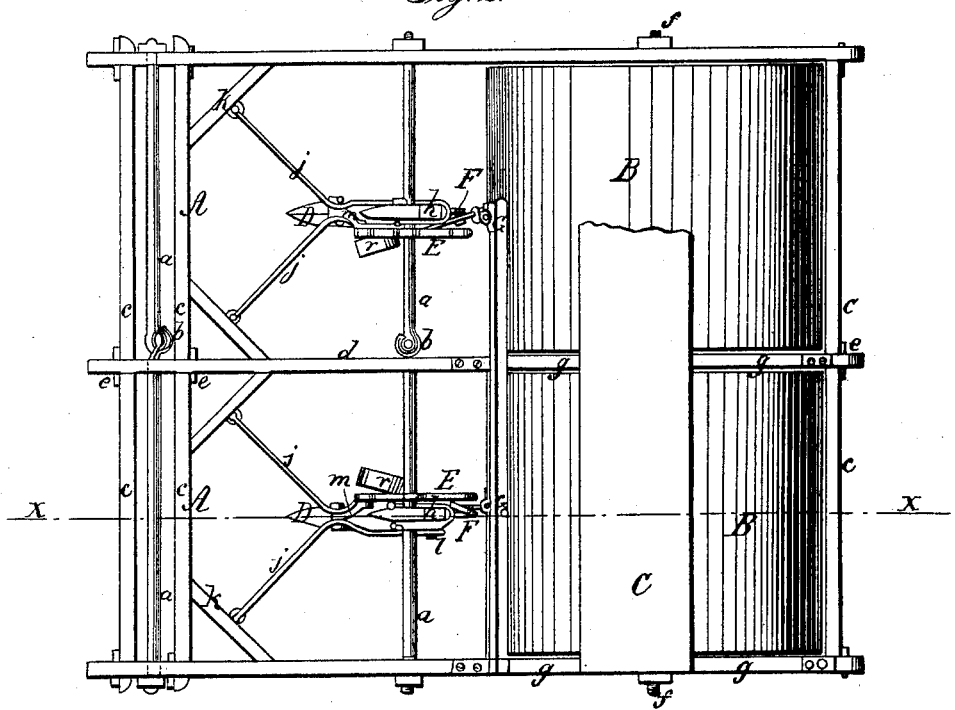
Witnesses:
Inventor:

UNITED STATES PATENT OFFICE.

JOHN W. HUDSON, OF LAFAYETTE, INDIANA.

IMPROVEMENT IN SEEDING-MACHINES.

Specification forming part of Letters Patent No. 26,770, dated January 10, 1860.

*To all whom it may concern:*

Be it known that I, J. W. HUDSON, of Lafayette, in the county of Tippecanoe and State of Indiana, have invented a new and Improved Combination of a Roller and Seeding-Machine; and I do hereby declare that the following is a full, clear, and exact description of the same, reference being had to the annexed drawings, making a part of this specification, in which—

Figure 1 is a side sectional view of my invention, taken in the line *x x*, Fig. 2. Fig. 2 is a plan or top view of the same.

Similar letters of reference indicate corresponding parts in the two figures.

To enable those skilled in the art to fully understand and construct my invention, I will proceed to describe it.

A A represent two rectangular frames, which, when both are designed to be used, are secured together, side by side, by rods *a*, which are connected by hooks *b* at their inner ends, and by having the tenons of the traverse-bars *c* at their inner ends fitted in mortises in the center bar, *d*, and secured thereon by key or wedges *e*. The frames A A are thus arranged that they may be readily detached when necessary, and only one frame used, and, when the two frames are used, capable of being firmly connected together. Each frame A is provided with a roller, B, the shaft or axles *f* of which are connected by being hooked together at their inner ends, the same as the rods *a*, the rollers B turning loosely on the axles *f f*.

C is the driver's seat, which is supported by bars *g* on one of the frames A and over its roller B.

On each rod *a*, directly in front of each roller B a tooth or share, D, is placed. These teeth or shares are hollow, so that each will have a seed-receptacle, *h*, within it, as shown clearly in Fig. 1. The front parts of the teeth or shares, at their upper parts, are slotted longitudinally, as shown at *i*, and the rods *a* pass through said slots, as shown clearly in Fig. 1.

To each tooth or share D two rods, *j j*, are attached. The front ends of these rods are connected by hooks and staples to braces *k* at the front parts of the frames A, the back ends of said rods being connected to the teeth by hooking over projecting pins *l*.

On each rod *a* a bent lever, E, is placed, the lower ends of said levers being connected by links *m* to the rods *j*, directly in front of the teeth or shares. Each tooth or share has a projection, *n*, at its back side, to which projections loaded levers F are attached, one to each. The lower ends of these levers are connected to slides *o*, which work in the teeth or shares, as shown clearly in Fig. 1. These slides *o* are each perforated with a hole, *p*, and the holes *p*, by actuating the slides *o*, through the medium of the rods G, which are connected to the lower ends of the levers F, are made to pass under the seed-receptacles *h*, so as to be filled with seed, and are then moved forward over the discharge-openings *q* of the teeth, so that the seed in the holes may drop in the furrows.

The rods G are operated by the driver, the holes *p* of the slides being shoved over the discharge-openings, and the seed dropped by pushing down the rods G, the slides being brought back by the weights *r* of the levers F when the rods are relieved from the pressure of the hand.

From the above description it will be seen that only one roller B and a single tooth D may be employed by simply detaching one frame A, and in case a roller is not required a caster-wheel may be adjusted at each side of the frame, the roller being removed. In case it is desired to roll the ground only, the tooth or share D may be readily detached. The teeth or shares D may be elevated at any time to pass over obstructions by simply actuating the levers E.

By this invention a very simple and efficient combined seeding-machine and roller is obtained. The implement may be constructed at a moderate cost, and there are no parts liable to become deranged by use.

I do not claim the employment or use of adjustable frames A A, provided each with rollers B; but,

Having thus described my invention, what I claim as new, and desire to secure by Letters Patent, is—

The teeth or shares D, provided with seed-receptacles *h*, fitted on the rods *a*, as shown, provided with seed-slides *o*, and arranged to operate substantially as and for the purpose set forth.

JOHN W. HUDSON.

Witnesses:
WM. H. LEVERING,
JOHN M. CLYUM.